United States Patent [19]

Vajna et al.

[11] Patent Number: 4,707,347

[45] Date of Patent: Nov. 17, 1987

[54] PROCESS FOR THE PRODUCTION OF POTASSIUM SULFATE FROM POTASSIUM CHLORIDE BY MEANS OF ION EXCHANGERS

[75] Inventors: Sandor Vajna, Bonn; Gerd Peuschel, Burgdorf, both of Fed. Rep. of Germany

[73] Assignee: Kali und Salz, Kassel, Fed. Rep. of Germany

[21] Appl. No.: 853,346

[22] Filed: Apr. 17, 1986

[30] Foreign Application Priority Data

Apr. 17, 1985 [DE] Fed. Rep. of Germany ....... 3513828
Mar. 7, 1986 [DE] Fed. Rep. of Germany ....... 3607641

[51] Int. Cl.$^4$ ...................... C01D 15/06; C22B 26/10
[52] U.S. Cl. .................................... 423/552; 423/157; 423/181; 423/497; 71/61; 71/63; 210/668; 210/670
[58] Field of Search ............... 423/157, 181, 552, 497, 423/498; 210/660, 608, 670; 71/61, 63

[56] References Cited

U.S. PATENT DOCUMENTS

| | | | |
|---|---|---|---|
| 2,671,714 | 3/1954 | McIlhenny et al. | 423/157 |
| 2,771,418 | 11/1956 | Zeegers | 423/552 |
| 3,243,318 | 3/1966 | Mihara et al. | 423/157 |
| 3,293,175 | 12/1966 | Popper et al. | 423/157 |
| 4,504,458 | 3/1985 | Knudsen | 423/497 |

FOREIGN PATENT DOCUMENTS

| | | | |
|---|---|---|---|
| 879581 | 8/1971 | Canada | 423/552 |
| 2051422 | 5/1972 | Fed. Rep. of Germany | 423/552 |

*Primary Examiner*—Gary P. Straub
*Attorney, Agent, or Firm*—Michael J. Striker

[57] ABSTRACT

A process is disclosed for the production of potassium sulfate from potassium chloride by means of a sulfate-laden anion exchanger, according to which as reaction solution, the exchanger is intensively contacted with a saturated potassium chloride solution, after saturation with potassium sulfate, and thereupon again separated, whereupon from this solution the crystals formed therein are separated, while the depleted anion exchanger is regenerated by intensive contact with a magnesium sulfate solution.

5 Claims, No Drawings

PROCESS FOR THE PRODUCTION OF POTASSIUM SULFATE FROM POTASSIUM CHLORIDE BY MEANS OF ION EXCHANGERS

BACKGROUND OF THE INVENTION

It is known to produce potassium sulfate and magnesium chloride by means of doubled, i.e., double replacement reaction of potassium chloride and magnesium sulfate. When this doubled reaction is performed in customary manner in aqueous media, the formation of double salts can only be avoided through considerable technical expense.

On the other hand, a process is known from German Offenlegungsschrift DE-OS No. 33 31 416 according to which the potassium chloride is converted into potassium- or sodium sulfate by means of anion exchangers under acid conditions. These techniques can be represented by the following reaction equations:

Production: $2KCl + R_2SO_4 \longrightarrow K_2SO_4 + 2RCl$
Regeneration: $2RCl + CaSO_4 \longrightarrow R_2SO_4 + CaCl_2$
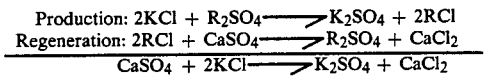
$CaSO_4 + 2KCl \longrightarrow K_2SO_4 + CaCl_2$ Herewith, initially a solution of the desired sulfate is recovered, from which subsequently, by means of addition of potassium- or sodium chloride, the sulfate is salted out. The filtrate separated from the produced crystals is employed for regeneration of the anion exchanger.

The knowledge that the solubility of calcium sulfate is greater in calcium chloride solutions than in water is essential for this technique. Regeneration of the anion exchanger is thereby unexpectedly favored. Indeed, there exists the danger that upon regeneration of the exchanger with the calcium sulfate suspension, the calcium sulfate crystals sedimenting on the exchanger particles will strongly impair the regeneration of the exchanger, and that consequently, the calcium sulfate sedimented on the exchanger particles will be removable only through very great technical expenditure.

Accordingly, there is a genuine need to develop other possibilities for the production of potassium sulfate, with which the disadvantages of the above-mentioned techniques do not occur.

SUMMARY OF THE INVENTION

It is therefore an object according to the present invention to develop a process for the production of potassium sulfate from potassium chloride by means of an anion exchanger loaded with sulfate ions.

This object is attained according to the present invention by a process for the production of potassium sulfate from potassium chloride by means of a sulfate ion-laden anion exchanger, in which a reaction solution of a saturated potassium chloride solution, after saturation with potassium sulfate, is intensively contacted with the weakly basic, sulfate-laden anion exchanger, and again separated therefrom, whereupon the crystals formed therein are separated from the obtained solution and the depleted anion exchanger is again loaded with sulfate ions by means of intensive contact with a magnesium sulfate solution.

A saturated potassium chloride solution is employed as reaction solution for the performance of the process according to the present invention, after the potassium sulfate has been dissolved therein, up to saturation. The content in the reaction solution of potassium sulfate amounts to between about 5 and 10 percent, relative to the total salts-content of the solution.

This reaction solution is intensively contacted with a weakly basic, sulfate-laden anion exchanger. Herewith the sulfate ions of the exchanger are replaced by chloride ions from the reaction solution, to the extent until an equilibrium has adjusted between solution and exchanger with regard to the exchanged ions, and therewith the exchange has finished. The potassium sulfate thereby produced crystallizes, since the applied reaction solution has already been saturated with potassium sulfate.

After completion of the exchange, the reaction solution is separated from the anion exchanger. It is advantageous herewith for the particles of the anion exchanger, preferably employed in granulate form, to have a greater diameter than the potassium sulfate crystals formed in the reaction solution by means of the exchanger.

Tests have shown that the potassium sulfate produced according to the present invention precipitates in a particle size of below 0.4 mm. It is therefore sufficient for the mentioned separation operation if the particle diameter of the anion exchangers amounts to more than 0.5 mm. For separation of the anion exchanger from the reaction solution, the exchanger can be stopped by means of a body operating as a sieve, having mesh width, i.e., pore diameter, lying at about 0.5 mm, while the solution containing the potassium sulfate crystals passes unhindered through the sieve body, such as e.g., a sieve web of corresponding mesh width.

Subsequently, the potassium crystals are separated from the reaction solution, then washed with a saturated potassium sulfate solution and finally dried. The separated washing solution can be employed equally as well for the production of fresh rotation solution as the reaction solution separated from the potassium sulfate crystals after saturation with potassium chloride.

It has further proven to be advantageous for performance of the process according to the present invention, to maintain constant the potassium chloride concentration of the reaction solution during the exchange reaction by means of addition of solid, preferably pulverized, potassium chloride. It is particularly favorable to intermix the potassium chloride to be added, beforehand with a small amount of reaction solution, and then introduce it in this form to the reaction solution. These measures provide for an increased utilization of the capacity of the exchanger.

Three known possibilities are available for the contacting of the reaction solution with the sulfate-laden weakly basic anion exchangers.

According to the first possibility, the exchanger can be employed as a solid-packed bed, preferably in a column, into which the reaction solution is introduced from above. The exchanger bed is advantageously disposed over a base having outlet openings, the diameter of which is smaller than the particle size of the exchangers, but greater than the particle size of the potassium sulfate crystals forming in the reaction solution. By means of suitable measures, e.g., flow through of air, it must be provided for that the exchanger and the reaction solution are intensively intermixed.

There exists also the possibility of introducing the reaction solution to the exchanger bed under pressure from below, and withdrawing the reaction solution mixed with the potassium sulfate crystals from the upper end of the exchanger. With these measures one arrives at a whirling up, i.e., fluidization of the packed exchanger by means of the flow pressure of the reaction solution therein.

Moreover, the possibility is available for intermixing the granular exchanger with the reaction solution and then maintaining the mixture in continuous movement, e.g., by means of stirring or agitation. The exchange is completed after about 10 to 20 minutes and the mixture can be further worked up according to the previously given operation procedure.

It has proven to be favorable for the process according to the present invention, to maintain the exchange mixture during the exchange at temperatures between about 10° and 40° C.

With the exchange reaction according to the present invention, 80 to 95 percent of the total capacity of the anion exchanger is loaded with chloride ions.

In order to extensively recover the sulfate ions still remaining in the exchanger, it can be advantageous to intensively contact the exchanger, before the regeneration stage, with a saturated potassium chloride solution. The solution remaining herewith after separation of the exchanger contains, in addition to potassium chloride, the newly-formed potassium sulfate. Both salts can be recovered from this solution by means of evaporation and fractionating crystallization in a manner known per se.

After the separation of the reaction solution from the anion exchanger, it is washed in known manner with water, before it is regenerated by means of intensive contact with magnesium sulfate solution, i.e., before it is loaded with sulfate ions. The magnesium chloride and magnesium sulfate contained in the regeneration solution separated from the regenerated exchanger can be recovered in known manner by means of evaporation and fractionating crystallization.

Weakly basic anion exchangers, composed from polyacrylate with secondary and tertiary amino groups are employed with particularly advantage in the process according to the present invention. It has further proven to be favorable to adjust all solutions contacting these weakly basic anionic exchangers according to the present invention beforehand, by means of acid, to a pH-value between 3 and 6. The solutions which serve for production of potassium sulfate are advantageously acidified with sulfuric acid, whereas the pH-value of the solutions employed for regeneration of the exchanger is adjusted by means of hydrochloric acid.

The process according to the present invention extensively avoids technical difficulties and disadvantages of the techniques known from the state of the art, and can be performed with greater effectiveness without technical difficulty.

The invention is described with greater particularity in the following non-limitative examples.

DESCRIPTION OF THE PREFERRED EMBODIMENTS

Example 1

Exchange process with the weakly basic anion exchanger resin Kastel of polyacrylate basis with predominantly secondary amino groups and having 2.2 val/l total capacity.

Test with 500 l resin volume in an exhange column.

Adjustment of all solutions to pH 3 with HCl or $H_2SO_4$.

I. Exchange Half-cycle of the Loading of the Resin with $SO_4^{--}$-ions.

After performance of four cycles and adjustment of a stationary state, a resin bed filled with water containing small amounts of potassium salts, is obtained at the end of the half-cycle described under II (infra), the bed having been loaded to 86% of its capacity with Cl-ions and to 14% of its capacity with $SO_4^{--}$-ions.

The following solutions are delivered successively to the bed, from above, at 25° C.:

| A1: | 150 l with 0.64 val $MgCl_2$/l and 0.06 val $MgSO_4$/l |
|---|---|
| A2: | 698 l with 1.40 val $MgSO_4$/l |
| A3: | 150 l with 0.04 val $MgCl_2$/l and 0.66 val $MgSO_4$/l |
| A4: | 150 l water |

Upon delivery of solutions A1–A4, the following flow from the column as eluate:

| E1: | 150 l with 0.13 val KCl/l 0.01 val $K_2SO_4$/l 0.10 val $MgCl_2$/l and 0.01 val $MgSO_4$/l |
|---|---|
| E2: | 150 l with 0.64 val $MgCl_2$/l and 0.06 val $MgSO_4$/l |
| E3: | 698 l with 1.26 val $MgCl_2$/l and 0.10 val $MgSO_4$/l |
| E4: | 150 l with 0.04 val $MgCl_2$/l and 0.66 val $MgSO_4$/l |

The eluates E1 and E3 are removed from the process. The eluates E2 and E4, which are identical with A1 and A3, are stored for re-employment in the next cycle.

The resin is loaded at this point to 94% of its capacity with $SO_4^{--}$-ions and to 6% of its capacity with $Cl^-$-ions.

II. Exchange-Half-cycle of the $K_2SO_4$-Recovery

To the water—(which by then contains small amounts of magnesium salts)—filled bed, initially the following solutions are then delivered:

| A5: | 150 l with 0.02 val KCl/l and 0.64 val $K_2SO_4$/l |
|---|---|
| A6: | 150 l with 0.06 val KCl/l and 1.24 val $K_2SO_4$/l |
| A7: | 150 l with 4.08 val KCl/l and 0.14 val $K_2SO_4$/l |
| Eluted therewith are: | |
| E5: | 150 l with 0.01 val $MgCl_2$/l 0.08 val $MgSO_4$/l <<0.01 val KCl/l and 0.09 val $K_2SO_4$/l |
| E6: | 150 l with 0.02 val KCl/l and 0.64 val $K_2SO_4$/l |
| E7: | 150 l with 0.06 val KCl/l and 1.24 val $K_2SO_4$/l |

E5 is removed form the process. E6 and E7 are stored for re-employment in the next cycle.

After termination of the runoff of E7, an intensive intermixing of resin and solution A7 is provided for by means of the blowing in of pressured air across inlets provided in the column.

During continuous intermixture, a further 828 l of solution A7 are provided. The solution A7, saturated in KCl and $K_2SO_4$, reacts therewith with the sulfate-laden resin under simultaneous KCl-diminution and $K_2SO_4$-crystallization. The converted solution and the formed $K_2SO_4$ are continuously expelled by means of the lower sieve base of the column, the sieve openings of which cannot pass the larger resin granules.

By means of addition of the following solution

| A8: | 150 l with 2.68 val KCl/l and 0.23 val $K_2SO_4$/l |
|---|---| the residual reaction solution with $K_2SO_4$-crystallilate is displaced from the column.

Produced completely from A7 is the eluate

| E8: | 978 with 3.14 val KCl/l and 0.22 val $K_2SO_4$/l |
|---|---| and a $K_2SO_4$-crystallizate amount of 69.8 kg.

The solution A7 is again produced by means of saturation of E8 with 68.5 kg KCl. It is employed again in the next cycle. Simultaneously, a further 6.8 kg. of $K_2SO_4$ precipitates, so that the produced amount comes to a total of 76.6 kg $K_2SO_4$.

The following solutions are then delivered to the column:

| A9: | 150 l with 1.84 val KCl/l and 0.16 val $K_2SO_4$/l |
|---|---|
| A10: | 150 l with 0.94 val KCl/l and 0.06 val $K_2SO_4$/l |
| A11: | 150 l water |

The following are eluted:

| E9: | 150 l with 2.68 val KCl/l and 0.32 val $K_2SO_4$/l |
|---|---|
| E10: | 150 l with 1.84 val KCl/l and 0.16 val $K_2SO_4$/l |
| E11: | 150 l with 0.94 val KCl/l and 0.06 val $K_2SO_4$/l |

The solutions E9-E11 are also stored for re-employment in the next cycle.

After runoff of solution E11, the resin is in the same state of loading as at the start of the half-cycle described under I.

Process Yields:

| $SO_4^{--}$: | 90.1% |
|---|---|
| K: | 96.1% |

The losses amount to:

| $SO_4^{--}$ | 0.3% in E1 |
|---|---|
| | 7.0% in E3 |
| | 2.6% in E5 |
| K | 2.3% in E1 |
| | 1.6% in E5 |

Example 2

Exchange process with the weakly basic anion exchanger Duolite, of polyacrylate basis with secondary and tertiary amino groups, having 2.5 val/l total capacity.

Tests with 500 l resin volume.

Adjustment of all solutions to pH 4 by means of HCl or $H_2SO_4$.

I. Exchange Half-cycle of the Loading of the Resin with $SO_4^{--}$ Ions

After performance of 6 cycles and adjustment of a stationary state, a resin bed filled with water containing small amounts of potassium salts is obtained at the end of the half-cycle described under II, loaded to 93% of its capacity with chloride ions and to 7% of its capacity with sulfate ions.

The following solutions are successively delivered to the bed, from above, at 60° C.:

| A1: | 150 l with 0.85 val $MgCl_2$/l and 0.12 val $MgSO_4$/l |
|---|---|
| A2: | 150 l with 1.58 val $MgCl_1$/l and 0.30 val $MgSO_4$/l |
| A3: | 900 l with 1.45 val $MgCl_2$/l and 1.50 val $MgSO_4$/l |
| A4: | 413 l with 3.0 val $MgSO_4$/l |
| A5: | 150 l with 0.74 val $MgCl_2$/l and 1.35 val $MgSO_4$/l |
| A6: | 150 l with 0.34 val $MgCl_2$/l and 0.71 val $MgSO_4$/l |
| A7: | 150 l water |

Upon delivery of solutions A1-A7, the following flow out from the column as eluate:

| E1: | 150 l with 0.15 val KCl/l 0.01 val $K_2SO_4$/l 0.12 val $MgCl_2$/l and 0.01 val $MgSO_4$/l |
|---|---|
| E2: | 150 l with 0.85 val $MgCl_2$/l and 0.12 val $MgSO_4$/l |
| E3: | 150 l with 1.58 val $MgCl_2$/l and 0.30 val $MgSO_4$/l |
| E4: | 413 l with 2.33 val $MgCl_2$/l and 0.56 val $MgSO_4$/l |
| E5: | 900 l with 1.45 val $MgCl_2$/l and 1.50 val $MgSO_4$/l |
| E6: | 150 l with 0.74 val $MgCl_2$/l and 1.35 val $MgSO_4$/l |
| E7: | 150 l with 0.34 val $MgCl_2$/l and 0.71 val $MgSO_4$/l |

The eluates E1 and E4 are removed from the process. The eluates E2, E3 and E5-E7 which are identical with A1, A2 and A4-A6, are stored for re-employment in the next cycle.

The resin has been loaded to 85% of its capacity with sulfate ions and to 15% of its capacity with chloride ions.

II. Exchange Half-cycle of $K_2SO_4$-Production

The following solutions are initially delivered to the bed filled with water containing small amounts of magnesium salts at a temperature of 25° C.:

| A8: | 150 l with 0.03 val KCl/l and 0.61 val $K_2SO_4$/l |
|---|---|
| A9: | 150 l with 0.08 val KCl/l and 1.17 val $K_2SO_4$/l |
| A10: | 150 l with 4.08 val KCl/l and 0.14 val $K_2SO_4$/l |

Eluted in connection therewith are the following:

| E8: | 150 l with 0.04 val $MgCl_2$/l 0.10 val $MgSO_4$/l <0.01 val KCl/l and 0.08 val $K_2SO_4$/l |
|---|---|

-continued

| | |
|---|---|
| E9: | 150 l with 0.03 val KCl/l and 0.61 val K$_2$SO$_4$/l |
| E10: | 150 l with 0.08 val KCl/l and 1.17 val K$_2$SO$_4$/l |

E8 is removed from the process. E9 and E10 are stored for re-employment in the next cycle.

After E10 has quantitatively run out from the column, the resin as it is after A10 addition is rinsed over into a stirrer vessel into which simultaneously 75.3 kg of KCl-crystallizate is provided, by means of a further 300 l of solution A10.

There follows in the stirrer vessel the desorption of the sulfate ions from the resin and the crystallization of K$_2$SO$_4$, while by means of post-dissolving of KCl, the KCl- and K$_2$SO$_4$-concentrations of the solution are not altered. Until the end of the reaction, all of the KCl is maintained in solution.

The contents of the stirrer vessel are delivered across a sieve which is permeable for the fine K$_2$SO$_4$-crystals but impermeable for the coarser resin particles. By means of rinsing with a further 200 l of A10, a complete separation of the K$_2$SO$_4$ from the resin is provided. 84.5 kg of K$_2$SO$_4$ are recovered. Finally, the resin is again introduced into the exchange column, the intermediate spaces of which by this time have been filled with 150 l of solution A10. This solution A10 is displaced with the following delivered solution:

| | |
|---|---|
| A11: | 150 l with 2.95 val KCl/l and 0.28 val K$_2$SO$_4$/l |

All of solutions A10 (as eluate: E11), a total of 800 l, which have the composition of original A10, are stored for re-employment in the next half-cycle.

The following solutions are then delivered to the column:

| | |
|---|---|
| A12: | 150 l with 2.01 val KCl/l and 0.20 val K$_2$SO$_4$/l |
| A13: | 150 l with 0.96 val KCl/l and 0.11 val K$_2$SO$_4$/l |
| A14: | 150 l water |

Eluated in connection therewith are the following:

| | |
|---|---|
| E12: | 150 l with 2.95 val KCl/l and 0.28 val K$_2$SO$_4$/l |
| E13: | 150 l with 2.01 val KCl/l and 0.20 val K$_2$SO$_4$/l |
| E14: | 150 l with 0.96 val KCl/l 0.11 val K$_2$SO$_4$/l |

E12–E14 are then stored for re-employment in the next cycle.

After complete runoff of solution E14, the resin is again in the condition of loading that it was in at the start of the half-cycle described under I.

Process Yields:

| | |
|---|---|
| SO$_4^{--}$: | 78.7% |
| K+: | 96.4% |

Losses amount to:

| | |
|---|---|
| —SO$_4^{--}$ | 0.2% in E1 |
| | 2.2% in E4 |
| | 18.9% in E8 |
| —K+ | 2.4% in E1 |
| | 1.2% in E8 |

It will be understood that each of elements described above, or two or more together, may also find a useful application in other types of salt production different from the types described above.

While the invention has been described and illustrated as embodied in a process for the production of potassium sulfate from potassium chloride by means of ion exchangers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of specific or generic aspects of this invention.

What is claimed as new and desirous of protected by Letters Patent is set forth in the appended claims.

We claim:

1. Process for the production of potassium sulfate from potassium chloride by means of a sulfate ion-laden anion exchanger, comprising
    preparing a saturated KCl solution,
    saturating said solution with K$_2$SO$_4$,
    contacting the resulting solution with said exchanger to convert KCl to K$_2$SO$_4$ upon exchange,
    separating first the formed K$_2$SO$_4$ crystal-containing reacted solution from said exchanger,
    then separating the K$_2$SO$_4$ crystal from the removal solution and
    reloading said exchanger by contacting with MgSO$_4$ solution.

2. The process according to claim 1, wherein particles of said anion exchanger display a greater diameter than crystals formed in said solution.

3. A process according to claim 1 further comprising conducting the exchange reaction in the presence of solid potassium chloride.

4. The process according to claim 1, further comprising before regeneration of said anion exchanger, intensively contacting the same with a K$_2$SO$_4$-free, saturated KCl solution and then separating the anion exchanger from the saturated KCl solution.

5. The process according to claim 1, further comprising maintaining the exchange mixture during the exchange at a temperature between about 10° and 40° C.

* * * * *